(12) United States Patent
Gourley (10) Patent No.: US 9,471,781 B2
(45) Date of Patent: Oct. 18, 2016

(54) METHOD AND APPARATUS FOR MONITORING AND FILTERING UNIVERSAL SERIAL BUS NETWORK TRAFFIC

(71) Applicant: Cisco Technology, Inc., San Jose, CA (US)

(72) Inventor: Christopher Shannon Gourley, Sweetwater, TN (US)

(73) Assignee: Cisco Technology, Inc., San Jose, CA (US)

( * ) Notice: Subject to any disclaimer, the term of this patent is extended or adjusted under 35 U.S.C. 154(b) by 62 days.

(21) Appl. No.: 13/975,130

(22) Filed: Aug. 23, 2013

(65) Prior Publication Data
US 2015/0058991 A1 Feb. 26, 2015

(51) Int. Cl.
*G06F 21/56* (2013.01)

(52) U.S. Cl.
CPC ............ *G06F 21/56* (2013.01); *G06F 21/567* (2013.01)

(58) Field of Classification Search
CPC ........ G06F 15/16; G06F 11/00; G06F 12/14; G06F 21/00; G06F 21/56; G06F 21/567
USPC ........................................................ 726/24
See application file for complete search history.

(56) References Cited

U.S. PATENT DOCUMENTS

| | | | |
|---|---|---|---|
| 2004/0268147 A1* | 12/2004 | Wiederin | G06F 21/567 726/12 |
| 2007/0199060 A1 | 8/2007 | Touboul | |
| 2011/0197280 A1 | 8/2011 | Young et al. | |
| 2012/0240234 A1* | 9/2012 | Lomont et al. | 726/24 |
| 2012/0311207 A1* | 12/2012 | Powers | G06F 13/385 710/106 |
| 2013/0227691 A1* | 8/2013 | Aziz et al. | 726/24 |
| 2013/0246663 A1* | 9/2013 | Raveendran | G06F 13/4022 710/8 |

FOREIGN PATENT DOCUMENTS

WO     WO 2007069245 A2     6/2007

OTHER PUBLICATIONS

Renee Robbins Bassett; "Security Appliance Protects Against USB-Stick-Delivered Malware"; Automation World; http://www.automationworld.com/security/security . . . ; May 5, 2012.

* cited by examiner

*Primary Examiner* — Jeffrey Pwu
*Assistant Examiner* — Samuel Ambaye
(74) *Attorney, Agent, or Firm* — P. Su (57) ABSTRACT

In one embodiment, a method includes obtaining at least one packet from a first element on a Universal Serial Bus (USB) bus. The at least one packet is intended for a second element. The method also includes processing the at least one packet to determine whether the at least one packet is associated with unsafe content, and providing the at least one packet to the second element if it is determined that the at least one packet is not associated with the unsafe content. The at least one packet is provided to the second element on the USB bus. Finally, the method includes blocking the at least one packet from being provided to the second element when it is determined that the at least one packet is associated with the unsafe content.

16 Claims, 7 Drawing Sheets

METHOD AND APPARATUS FOR MONITORING AND FILTERING UNIVERSAL SERIAL BUS NETWORK TRAFFIC

TECHNICAL FIELD

The disclosure relates generally to protecting computing systems from malicious software. More particularly, the disclosure relates to an appliance which detects and blocks malicious traffic on a Universal Serial Bus (USB) bus before the malicious traffic may pass between the appliance and a computing system.

BACKGROUND

When malicious traffic is passed to a computing system, the integrity of the computing system may be compromised. For example, viruses, malware, and/or other malicious software contained in traffic may undermine the operation of a computer system if allowed to pass to the computer system.

Typically, in order to protect a computing system, e.g., an end-user system, from malicious traffic, software may be executed on the computing system to determine when traffic received on the computing system includes malicious content. While such software may be effective in identifying traffic received on a computing system that includes malicious content, vulnerabilities in lower level systems and/or drivers of the computing system may be exploited by the malicious content before software executed on the computing system identifies the malicious content. For example, a virus which affects a lower level system associated with an end-user system may effectively infect the lower level system before the virus is detected by the end-user system.

A source of traffic may be a media device that effectively stores the traffic, e.g., packets, and such traffic may effectively be uploaded to an end-user system. When such a media device contains malicious content, the malicious content may be uploaded to an end-user system and may affect systems associated with the end-user system before the content is identified as being malicious.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

According to one aspect, a method includes obtaining at least one packet from a first element on a Universal Serial Bus (USB) bus. The at least one packet is intended for a second element. The method also includes processing the at least one packet to determine whether the at least one packet is associated with unsafe content, and providing the at least one packet to the second element if it is determined that the at least one packet is not associated with the unsafe content. The at least one packet is provided to the second element on the USB bus. Finally, the method includes blocking the at least one packet from being provided to the second element when it is determined that the at least one packet is associated with the unsafe content.

Description

Protecting a computing system, as for example an end-user system, from viruses, malware, and/or other malicious software allows the integrity of the computing system to be preserved. Often, malicious traffic passes over a Universal Serial Bus (USB) bus between a host USB system, e.g., an end-user system, and a USB client device, e.g., a USB media device. While a host USB system may detect when viruses, malware, and/or other malicious software is present on the host USB system, the viruses, malware, and/or other malicious software may already be attacking the host USB system when detected. For example, a device driver may effectively be attacked by viruses, malware, and/or other malicious software before the host USB system is able to detect the viruses, malware, and/or other malicious software. When the malicious traffic reaches the host USB system before the malicious traffic is detected, the integrity of the host USB system may be compromised.

By providing a substantially standalone appliance or device that connects to a USB bus and monitors traffic intended for a computing system, the standalone appliance may identify malicious content and prevent the malicious content from adversely affecting the computing system. The standalone appliance may effectively serve as a firewall, an intrusion detection system (IDS) and/or an intrusion prevention system (IPS) that prevents malicious content from reaching the computing system, e.g., a system which contains a USB host controller. When the standalone appliance determines that particular content is malicious, the standalone appliance may be able to alert a user of the computing system that traffic intended for the computing system includes malicious content before the malicious content has effectively reached the standalone appliance. In addition, the standalone appliance may prevent or block the malicious content from reaching the computing system.

A standalone appliance may compare traffic against signatures of known viruses, malware, and/or malicious software, and determine whether the traffic is malicious, or includes malicious content. When traffic is identified as being malicious, the standalone appliance may alert a user of an end-user system for which the traffic was intended, and otherwise prevent the traffic from reaching the end-user system. In one embodiment, the standalone appliance may operate at a lowest USB protocol or packet level. It should be appreciated that in lieu of comparing traffic against signatures of known viruses, malware, and/or malicious software, the traffic is not limited to being compared against signatures of known viruses, malware, and/or malicious software to identify malicious traffic. Any suitable method may generally be used by a standalone appliance to detect malicious traffic. By way of example, traffic may be processed to identify anomalies, and traffic containing anomalies may be classified as being malicious or at least potentially malicious.

Figure 1:
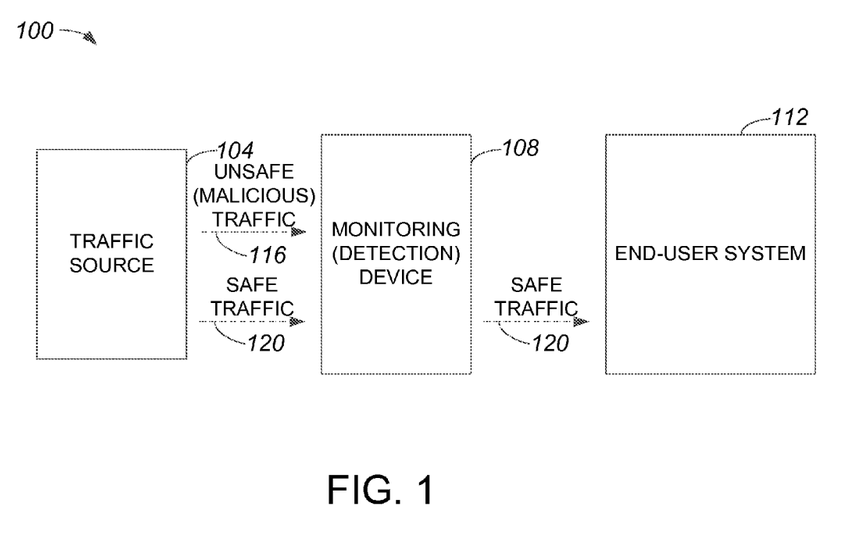
FIG. 1 is a diagrammatic representation of an overall system in which a monitoring appliance or device that monitors and filters Universal Serial Bus (USB) traffic is coupled between a source of traffic and an end-user system in accordance with an embodiment.

Referring initially to FIG. 1, an overall system in which a monitoring appliance or device that monitors and filters USB network traffic is coupled between a source of traffic and an end-user system in accordance will be described in accordance with an embodiment. An overall system 100 includes a traffic source 104, a monitoring device 108, and an end-user system 112, e.g., a computer device. Monitoring device 108 may be a USB hub that is external with respect to end-user system 112, and coupled to end-user system 112 and arranged to receive traffic 116, 120 from traffic source 104. In one embodiment, traffic source 104 may be coupled to monitoring device 108 such that monitoring device 108 is effectively in direct communication with traffic source 104 and end-user system 112. Traffic source 104 may provide traffic 116, 120 to monitoring device 108 that is intended for end-user system 112, and end-user system 112 may provide traffic (not shown) to monitoring device 108 that is intended for traffic source 104.

Traffic source 104 may be any device or component that may be in communication with, e.g., physically coupled to, monitoring device 108. In one embodiment, traffic source 104 either includes a connector (not shown) that interfaces with a receptacle (not shown) of monitoring device 108, or includes a receptacle (not shown) that interfaces with a connector (not shown) of monitoring device 108. It should be appreciated that in some instances, traffic source 104 may be in wireless communication with and, therefore, communicably coupled to but not physically coupled to monitoring device 108.

Monitoring device 108 is generally arranged to process traffic 116, 120 to identify safe traffic 120 and unsafe, or malicious, traffic 116. Monitoring device 108 obtains traffic 116, 120, and upon identifying safe traffic 120 and unsafe traffic 116, may provide safe traffic 120 to end-user system 112 and prevent unsafe traffic 116 from being provided to end-user system. Any suitable method may be used by monitoring device 108 to identify safe traffic 120 and unsafe traffic 116 by comparing signatures associated with traffic 116, 120 to known signatures of unsafe content, e.g., known signatures of viruses and/or malware. The signatures may be stored on monitoring device 108, and may be periodically updated by monitoring device 108. Updating the signatures may include, but is not limited to including, obtaining current signatures from a data repository (not shown) that is accessible to monitoring device 108.

Figure 2A:
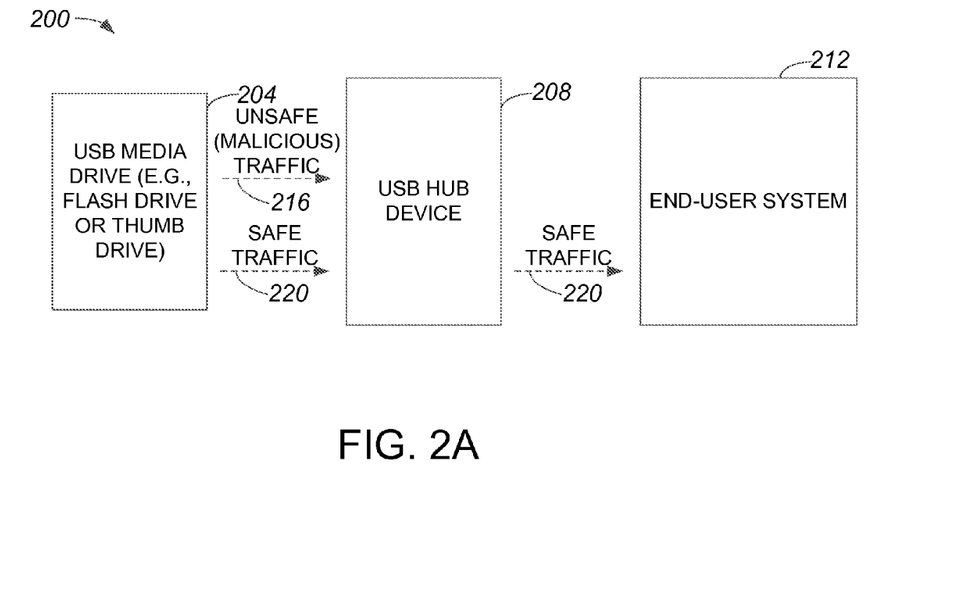
FIG. 2A is a diagrammatic representation of an overall system in which a USB hub device that monitors and filters USB traffic is coupled between a source of traffic and an end-user system in accordance with an embodiment.

In one embodiment, monitoring device 108 may be a USB hub device that monitors and filters USB traffic. FIG. 2A is a diagrammatic representation of an overall system in which a USB hub device that monitors and filters USB traffic is coupled between a source of traffic and an end-user system in accordance with an embodiment. An overall system 200 includes a USB device 204 which, in the described embodiment, is a USB media drive 204. System 200 also includes a USB hub device 208 and an end-user system 212, e.g., a computer device with a USB host controller (not shown).

USB media drive 204, which may be a flash drive or a thumb drive, may be coupled to USB hub device 208 and may provide unsafe USB network traffic 216 and safe USB network traffic 220 to USB hub device 208. It should be appreciated that USB media drive 204 is not limited to being a flash drive or a thumb drive. In other words, USB media drive 204 may generally be any suitable device that stores data or traffic, and is arranged to engage in USB communications.

USB hub device 208 is generally configured to identify and to filter out unsafe traffic 216 using any suitable method, and to prevent unsafe traffic 216 from passing to end-user system 212 while allowing safe traffic 220 to pass to end-user system 212. USB media drive 204 may include a connector (not shown) that interfaces with a receptacle (not shown) of USB hub device 208, or may include a receptacle (not shown) that interfaces with a connector (not shown) of USB hub device 208.

The functionality implemented by USB hub device 208, e.g., the functionality that allows unsafe traffic 204 to be identified and effectively prevented from reaching end-user system 212, may be provided, in one embodiment, on a USB media drive rather than on USB hub device 208. That is, a USB media drive may include functionality which identifies unsafe, or malicious, content and prevents that content from being provided to an end-user system when the USB media drive is interfaced with the end-user system.

Figure 2B:
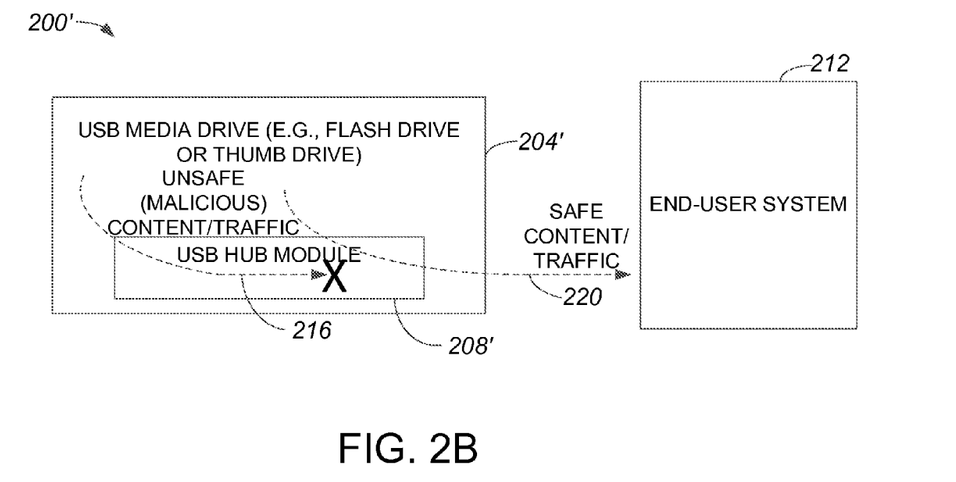
FIG. 2B is a diagrammatic representation of an overall system in which a USB media device includes a USB hub module that monitors and filters USB traffic in accordance with an embodiment.

An embodiment in which the ability to monitor traffic content, or contents of packets included in traffic, may be provided in a USB media device which is also a source of USB network traffic will be described with respect to FIG. 2B. FIG. 2B is a diagrammatic representation of an overall system in which a USB media device includes a USB hub module that monitors and filters USB traffic in accordance with an embodiment. An overall system 200' includes a USB media drive 204' that is in communication with, e.g., physically interfaced with, an end-user system 212. USB media drive 204', which may be a flash drive or a thumb drive, includes a USB hub module 208' that is arranged to monitor and to process content or traffic 216, 220 that is to effectively pass from USB media drive 204' to end-user system 212. USB hub module 208' is configured to identify unsafe content or traffic 216, and to prevent unsafe content or traffic 216 from passing to end-user system 212. USB hub module 208' is also configured to identify safe content or traffic 220, and to allow safe content or traffic 220 to pass to end-user system 212. USB hub module 208' may, upon detecting that USB media drive 204' is substantially interfaced with end-user system 212, compare addresses associated with content or traffic 216, 220 to known addresses of safe data to identify unsafe content or traffic 216 and to identify safe content or traffic 220.

Figure 2C:
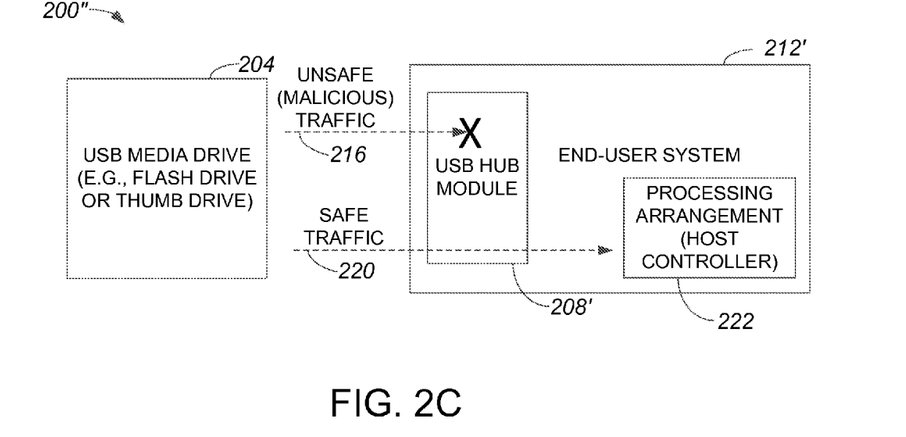
FIG. 2C is a diagrammatic representation of an overall system in which an end-user system includes a USB hub module that monitors and filters USB traffic in accordance with an embodiment.

The functionality which effectively monitors USB network traffic to filter out unsafe or malicious traffic may, in one embodiment, be provided on an end-user system such that unsafe or malicious traffic may be identified before such traffic is passed to a processing arrangement, or a USB host controller, of the end-user system. An end-user system may, for example, have a built-in USB hub that provides more than one USB port. An end-users system with a built-in USB hub may include an integrated circuit chip that provides USB hub functionality. Functionality which effectively monitors USB network traffic to filter out unsafe or malicious traffic may be provided on an integrated circuit chip that provides USB hub functionality in an end-user system, in one embodiment. FIG. 2C is a diagrammatic representation of an overall system in which an end-user system includes a USB hub module that monitors and filters USB traffic in accordance with an embodiment. An overall system 200" includes a USB media drive 204 that is in communication with, e.g., physically interfaced with, an end-user system 212.' USB media drive 204 may be a flash drive or a thumb drive, or any suitable device that is configured to engage in USB communications with end-user system 212'.

A USB hub module 208' is arranged to monitor and to process content or traffic 216, 220 that is to effectively pass from USB media drive 204 to end-user system 212 when USB media drive 204 is in communication with end-user system 212'. USB hub module 208' is configured to obtain and to identify unsafe content or traffic 216, and to prevent unsafe content or traffic 216 from passing to a processing arrangement 222 of end-user system 212'. In other words, USB hub module 208' is configured to identify unsafe traffic 216 such that unsafe traffic 216 may be prevented from being processed.

USB hub module 208' is also configured to identify safe content or traffic 220, and to allow safe content or traffic 220 to pass to processing arrangement 222 of end-user system 212'. USB hub module 208' may, upon detecting that USB media drive 204 is substantially interfaced with end-user system 212 and causing traffic to be sent to end-user system 212', compare signatures associated with content or traffic 216, 220 to known signatures of safe data to identify unsafe content or traffic 216 and to identify safe content or traffic 220.

Figure 3:
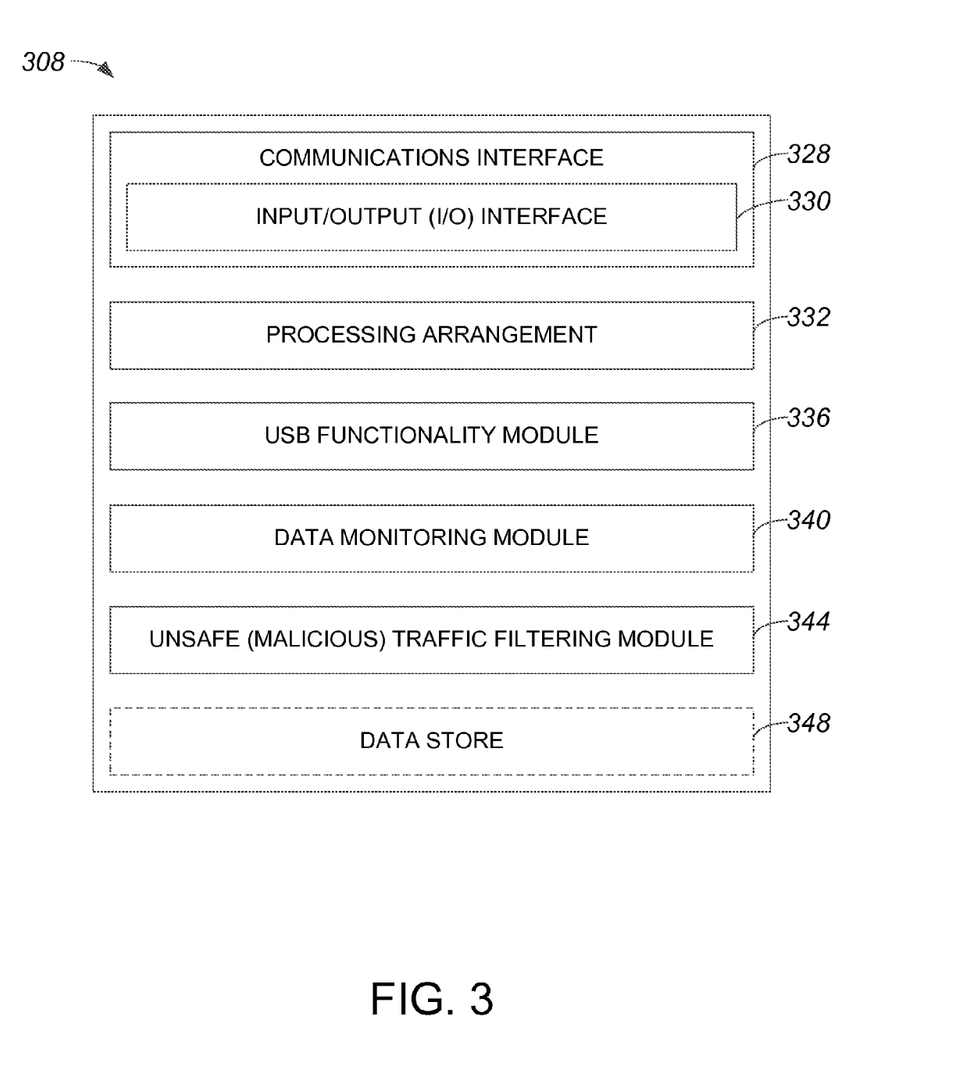
FIG. 3 is a block diagram representation of a USB hub device in accordance with an embodiment.

As previously described, as for example with respect to FIG. 2A, a USB hub device may serve as an interface between a USB media drive and an end-user system, and prevent unsafe USB network traffic associated with the USB media drive from reaching the end-user system. It should be appreciated that a USB hub device may also prevent unsafe USB network traffic associated with an end-user system from reaching a USB media drive. With reference to FIG. 3, a USB hub device will be described in accordance with an embodiment. A USB hub device 308 is generally arranged to receive USB network traffic, or traffic received on a USB bus, and to identify unsafe content within the traffic such that the unsafe content may effectively be prevented from being provided to a destination, e.g., an end-user system.

USB hub device 308 includes a communications interface 328 that is generally arranged to engage in USB communications, or communications on a USB bus (not shown). Communications interface 328 includes an input/output (I/O) interface 330. I/O interface 330 may include a port arrangement that includes a USB connector, a USB receptacle, and/or wires. I/O interface 330 may be configured to allow USB hub device 308 to be physically interfaced with a USB media drive and an end-user system.

USB hub device 308 also includes a processing arrangement 332 which includes at least one processor (not shown), and is configured to execute logic. Logic associated with a USB functionality module 336, a data monitoring module 340, and an unsafe traffic filtering module 344 may be executed by processing arrangement 332.

USB functionality module 336 is arranged to allow USB hub device 308 to identify USB network traffic. In addition, USB functionality module 336 allows USB hub device 308 to process USB network traffic appropriately.

Data monitoring module 340 is arranged to process traffic obtained off of a USB bus (not shown) by communications interface 328, and to determine whether particular traffic is safe or unsafe. Data monitoring module 340 may obtain signatures and/or information relating to known unsafe data, e.g., viruses or malware, to compare with signatures associated with obtained traffic. In one embodiment, such signatures for known unsafe data may be obtained from an optional data store 348 that may be periodically updated to maintain a current list of signatures for known unsafe data. It should be appreciated, however, that data monitoring module 340 may instead obtain signatures for known unsafe data from any suitable external data source.

Safe traffic identified by data monitoring module 340 may effectively be forwarded to, or otherwise passed to, a destination through communications interface 328. Unsafe traffic identified by data monitoring module 340 may effectively be prevented from being forwarded by unsafe or malicious traffic filtering module 344. Unsafe or malicious traffic filtering module 344 may also provide a warning relating to unsafe traffic. By way of example, in addition to preventing unsafe traffic from reading an end-user system, unsafe or malicious traffic filtering module 344 may provide an indication to the end-user system that a USB media drive is attempting to load unsafe content onto the end-user system.

Figure 4:
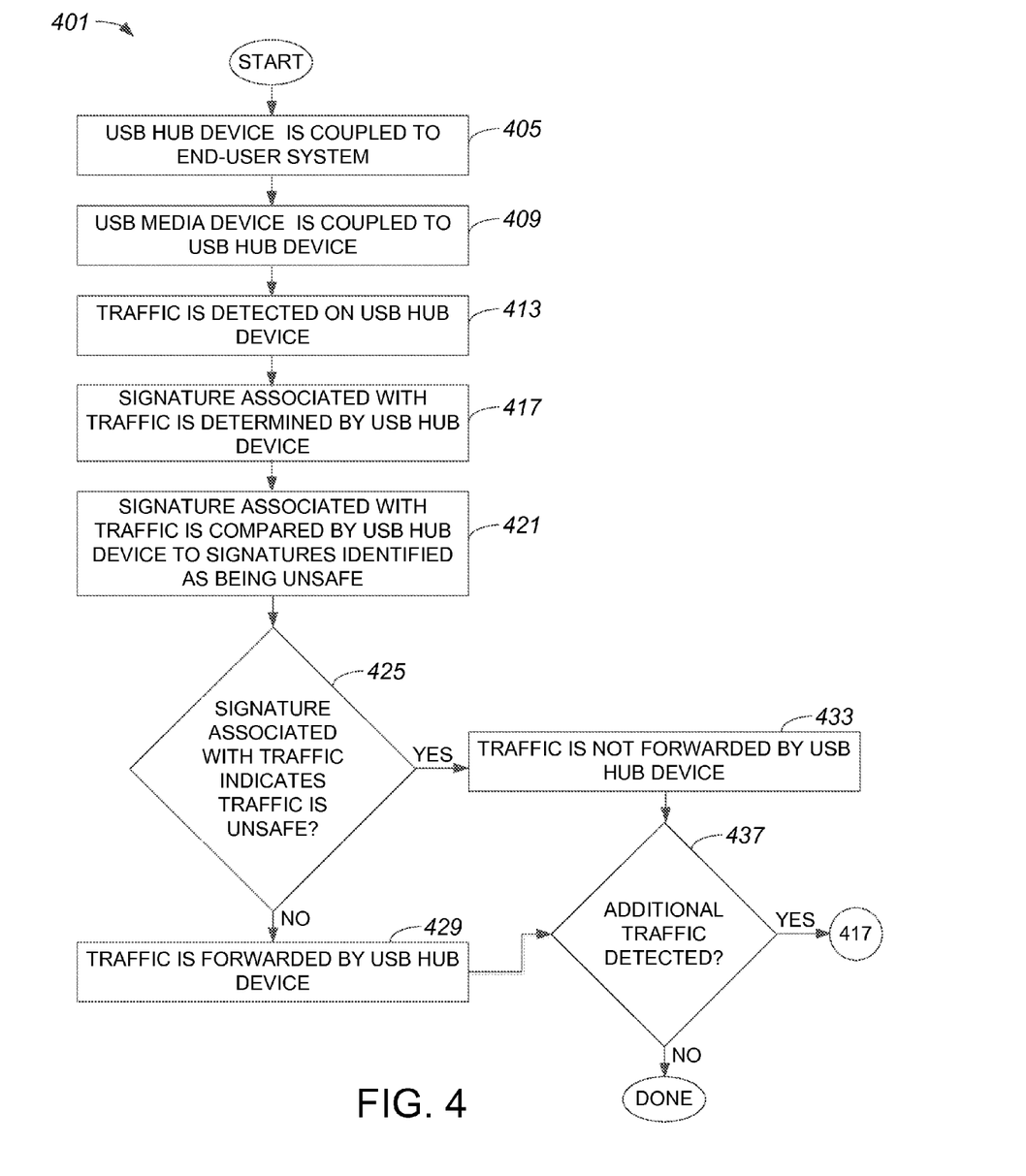
FIG. 4 is a process flow diagram which illustrates one method of monitoring and filtering USB traffic using a USB hub device in accordance with an embodiment.

Referring next to FIG. 4, one method of monitoring and filtering USB network traffic using a USB hub device will be described in accordance with an embodiment. A method 401 of monitoring and filtering USB network traffic begins at step 405 in which a USB hub device is coupled to an end-user system. For example, the USB hub device may be coupled to a USB port of the end-user system such that the USB hub device and the end-user system are arranged to communicate over a USB bus.

A USB media device or, more generally, a USB device is coupled to the USB hub device in step 409. It should be appreciated that the USB media device may, instead, be coupled to the USB hub device prior to the USB hub device being coupled to an end-user system. The USB media device may, for example, be coupled to a USB port of the USB hub device such that the USB hub device and the USB media device may communicate over a USB bus.

Traffic, e.g., USB network traffic, is detected in step 413 by the USB hub device 413. The traffic may generally be traffic that originates from the USB media device, although it should be appreciated that the traffic may instead be traffic that originates from the end-user system. Once the traffic is detected, a signature associated with the traffic is determined or otherwise identified by the USB hub device in step 417.

After the signature associated with the traffic is determined, the signature associated with the traffic is compared in step 421 by the USB hub device to signatures identified, or otherwise know, as being associated with unsafe content. Signatures identified as being unsafe may be obtained from any suitable database or repository of known unsafe content.

A determination is made in step 425 as to whether the signature associated with the traffic indicates that the traffic is unsafe. That is, it is determined if the signature associated with the traffic effectively matches a signature known to be associated with unsafe content. If the determination is that the signature associated with the traffic does not indicate that the traffic is unsafe, the indication is that the traffic is safe. As such, process flow moves from step 425 to step 429 in which the traffic is forwarded by the USB hub device, e.g., to the end-user system or to the USB media device, as appropriate.

Once the traffic, i.e., safe traffic, is forwarded, it is determined in step 437 whether additional traffic is detected. If it is determined that additional traffic is detected the process flow returns to step 417 in which a signature associated with the additional traffic is determined by the USB hub device. Alternatively, if the determination is that additional traffic is not detected, the method of monitoring and filtering USB network traffic is completed.

Returning to step 425, if it is determined that the signature associated with the traffic indicates that the traffic is unsafe, then the traffic is not forwarded by the USB hub device 433. In one embodiment, not forwarding the traffic may include providing an indication that the traffic is unsafe. For example, the USB hub device may provide the end-user system with an indication that the USB media drive attempted to load unsafe content onto the end-user system, or the USB hub device may provide the USB media drive with an indication that the end-user system attempted to load unsafe content onto the USB media drive. From step 433, process flow moves to step 437 in which it is determined whether additional traffic is detected.

Figure 5:
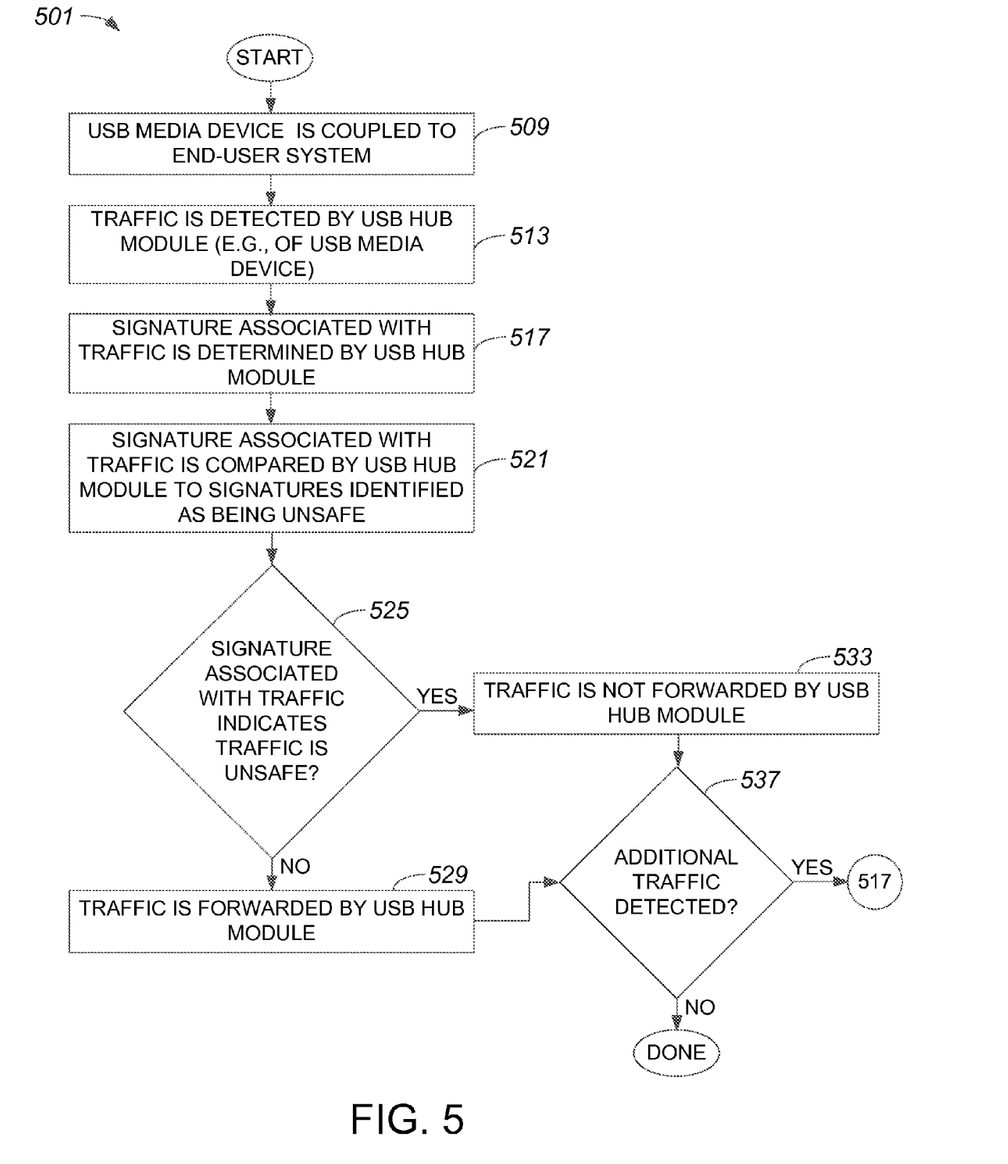
FIG. 5 is a process flow diagram which illustrates one method of monitoring and filtering USB traffic using a USB hub module, e.g., a USB hub module installed on a USB media device, in accordance with an embodiment.

As previously mentioned, functionality which enables unsafe or malicious USB network traffic to be detected prior to being provided to a processing arrangement of an end-user system is not limited to being implemented on a USB hub device. For example, such functionality may be provided on a USB media device, or on an end-user system FIG. 5 is a process flow diagram which illustrates one method of monitoring and filtering USB network traffic using a USB hub module, e.g., a USB hub module installed on a USB media device, in accordance with an embodiment. A method of monitoring and filtering USB network traffic begins at step 501 in which a USB media device is coupled to an end-user system. Coupling the USB media device, which includes a USB hub module such as USB hub module 208' of FIG. 2B in one embodiment, to the end-user system may include coupling a USB connector of the USB media device to a USB receptacle of the end-user system such that the USB media device and the end-user system may communicate on a USB bus. For ease of discussion, the USB hub module is described as being provided on a USB media device. It should be understood, however, that a USB hub module may instead be provided on an end-user system as discussed above with respect to FIG. 2C.

Once the USB media device and the end-user system are coupled, USB network traffic is detected by the USB hub module in step 513. In the described embodiment, the USB network traffic detected by the USB hub module is traffic that the USB media device is attempting to send to the end-user system. It should be appreciated, however, that the USB network traffic may instead be traffic that the end-user system is attempting to send to the USB media device.

A signature associated with the USB network traffic is determined or otherwise identified by the USB hub module in step 517. After the signature associated with the USB network traffic is determined, the signature associated with the USB network traffic is compared, in step 521, with signatures identified as being unsafe, e.g., signatures of known viruses or malware.

It is determined in step 525 whether the signature associated with the traffic indicates that the traffic is unsafe. In other words, it is determined whether the signature associated with the traffic effectively matches any signatures identified as being unsafe. If the determination in step 525 is that the signature associated with the traffic indicates that the traffic is not unsafe, the implication is that the traffic is safe. Accordingly, process flow moves from step 525 to step 529 in which the traffic is forwarded by the USB hub module. In one embodiment, the USB hub module is located on the USB media device and, as such, traffic is effectively forwarded form the USB media device to the end-user system. In another embodiment, the USB hub module may be located on the end-user system such that traffic is effectively allowed to pass through the USB hub module to a processing arrangement of the end-user system.

Once the traffic is forwarded by the USB hub module, a determination is made in step 527 as to whether additional traffic is detected. If it is determined that additional traffic is detected, then process flow returns to step 517 in which a signature associated with the additional traffic is determined. On the other hand, if it is determined that additional traffic is not detected, than the method of monitoring and filtering USB network traffic is completed.

Returning to step 525, if the determination is that the signature associated with the traffic indicates that traffic is unsafe, then the traffic is not forwarded by the USB hub module in step 533. When the USB hub module is located on the USB media drive, then the traffic is prevented from reaching the end-user system. When the USB hub module is located on the end-user system, traffic may be prevented from reaching a processing system of the end-user system. In one embodiment, not forwarding traffic may include providing an indication that unsafe traffic has been detected. After the traffic is not forwarded by the USB hub module, process flow moves to step 537 in which it is determined if additional traffic is detected.

Figure 6:
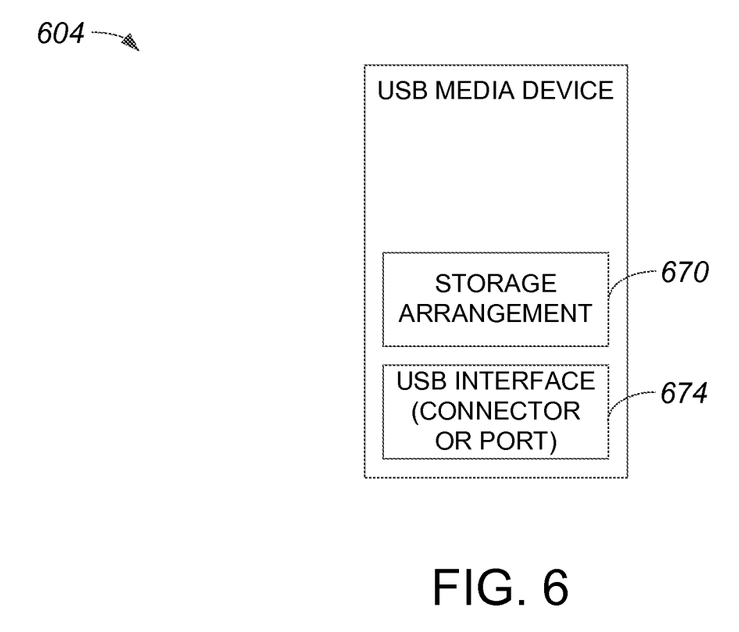
FIG. 6 is a block diagram representation of a USB media device in accordance with an embodiment.

In general, a USB media device is any suitable device which may store content and may communicate using USB communications, e.g., communicate on a USB bus. FIG. 6 is a block diagram representation of a USB media device in accordance with an embodiment. A USB media device 604 includes a storage arrangement 670 and an USB interface 674. Storage arrangement 670 is arranged to store content, as for example content that may be transmitted on and/or obtained from a USB bus. USB interface 674, which may include a USB connector or port, is configured to allow USB media device 604 to be coupled to a USB hub device (not shown) or an end-user system (not shown).

Although only a few embodiments have been described in this disclosure, it should be understood that the disclosure may be embodied in many other specific forms without departing from the spirit or the scope of the present disclosure. By way of example, a monitoring device such as a USB hub device has been described as detecting malicious traffic. In addition to detecting malicious traffic, a monitoring device may also detect anomalous traffic and provide warnings relating to the anomalous traffic. That is, in addition to detecting malicious traffic, a monitoring device may detect traffic that is generally identified as unusual and, hence, suspect.

While signatures used to determine whether particular traffic is safe or unsafe have been described as being stored on a monitoring device such as a USB hub device, signatures may instead be obtained by the monitoring device from a source external to the monitoring device as needed. For instance, a monitoring device may access a repository that contains signatures substantially in real-time when the monitoring device is assessing whether traffic contains unsafe content.

USB network traffic may be any traffic, or content, that is transmitted and/or received on a USB bus. Such traffic may generally include data packets, and the data packets may include, but are not limited to including, packets that contain software applications, text, audio, and/or video.

A USB hub device may be implemented using a single integrated circuit chip. For an embodiment in which USB hub functionality is provided in a USB media device, the USB hub functionality may be provided as a field programmable gate array (FGPA) or as an application specific integrated circuit (ASIC).

While a traffic source has been described as being a USB media drive, it should be appreciated that a traffic source is not limited to being a USB media drive. A traffic source may more generally be any suitable device in a USB class. For example, a traffic source may be a USB mouse or a USB keyboard without departing from the spirit or the scope of the disclosure.

The embodiments may be implemented as hardware, firmware, and/or software logic embodied in a tangible, i.e., non-transitory, medium that, when executed, is operable to perform the various methods and processes described above. That is, the logic may be embodied as physical arrangements, modules, or components. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples is not to be limited to the details given herein, but may be modified within the scope of the appended claims.

What is claimed is:

1. A method comprising:
    obtaining, at a hub device, at least one packet from a first element, the at least one packet being obtained on a Universal Serial Bus (USB) bus, wherein the at least one packet is intended for a second element;
    processing, at the hub device, the at least one packet to determine whether the at least one packet is associated with unsafe content;
    providing the at least one packet from the hub device to a processing arrangement of the second element if it is determined that the at least one packet is not associated with the unsafe content, wherein the at least one packet is provided to the second element on the USB bus;
    blocking the at least one packet from being provided to the processing arrangement of the second element when it is determined that the at least one packet is associated with the unsafe content; and
    providing an indication to the second element when it is determined that the at least one packet is associated with the unsafe content, wherein the indication is arranged to indicate that the first element is attempting to provide the unsafe content to the second element.

2. The method of claim 1 wherein the first element is a USB media device and the second element is an end-user system, and wherein the end-user system includes a USB host controller.

3. The method of claim 2 wherein the hub device is coupled between the USB media device and the end-user system.

4. The method of claim 1 wherein processing the at least one packet to determine whether the packet is associated with unsafe content includes identifying a signature associated with the at least one packet and determining whether the signature associated with the at least one packet identifies the at least one packet as having the unsafe content.

5. The method of claim 4 wherein determining whether the signature associated with the at least one packet identifies the at least one packet as having the unsafe content includes obtaining a set of signatures associated with known unsafe content and comparing the signature associated with the at least one packet to the set of signatures.

6. The method of claim 1 wherein the first element is a storage arrangement of a USB media device, and wherein the at least one packet is obtained on the USB bus by the hub device included in the USB media device.

7. The method of claim 1 wherein the at least one packet is obtained on the USB bus by the hub device of a computing device, the computing device including the second element, the second element being a USB host controller.

8. A tangible, non-transitory computer-readable medium comprising computer program code, the computer program code, when executed, configured to:
    obtain, at a hub device, at least one packet from a first element, the at least one packet being obtained on a Universal Serial Bus (USB) bus, wherein the at least one packet is intended for a second element;
    process, at the hub device, the at least one packet to determine whether the at least one packet is associated with unsafe content;
    provide the at least one packet from the hub device to a processing arrangement of the second element if it is determined that the at least one packet is not associated with the unsafe content, wherein the at least one packet is provided to the second element on the USB bus;
    block the at least one packet from being provided to the processing arrangement of the second element when it is determined that the at least one packet is associated with the unsafe content; and
    provide an indication to the second element when it is determined that the at least one packet is associated with the unsafe content, wherein the indication is arranged to indicate that the first element is attempting to provide the unsafe content to the second element.

9. The tangible, non-transitory computer-readable medium comprising computer program code of claim 8 wherein the first element is a USB media device and the second element is an end-user system, and wherein the end-user system includes a USB host controller.

10. The tangible, non-transitory computer-readable medium of claim 8 wherein the hub device is coupled between the USB media device and the end-user system.

11. The tangible, non-transitory computer-readable medium comprising computer program code of claim 8 wherein the computer program code configured to process the at least one packet to determine whether the packet is associated with unsafe content is further configured to identify a signature associated with the at least one packet and to determine whether the signature associated with the at least one packet identifies the at least one packet as having the unsafe content.

12. The tangible, non-transitory computer-readable medium comprising computer program code of claim 11 wherein the computer program code configured to determine whether the signature associated with the at least one packet identifies the at least one packet as having the unsafe content is further configured to obtain a set of signatures associated with known unsafe content and to compare the signature associated with the at least one packet to the set of signatures.

13. An apparatus comprising:

a processing arrangement;

a communications interface, the communications interface being configured to interface with a Universal Serial Bus (USB) device and an end-user system, the communications interface further being configured to intercept traffic from at least one of the USB media device and the end-user system from a USB bus; and logic, the logic being operable to determine whether the traffic includes unsafe content, wherein the logic is operable to provide the traffic to a destination on the USB bus when it is determined that the traffic does not include the unsafe content, and wherein the logic is further operable to block the traffic from being provided by the apparatus to the destination when it is determined that the traffic includes the unsafe content; wherein the logic operable to determine whether the traffic includes the unsafe content is further operable to identify a first signature associated with the traffic and to compare the first signature to at least one signature associated with known unsafe content.

14. The apparatus of claim 13 wherein the apparatus is a USB hub device, the destination includes a USB host controller, and the USB media device is a flash drive.

15. An apparatus comprising:

a processing arrangement;

a communications interface, the communications interface being configured to interface with a Universal Serial Bus (USB) device and an end-user system, the communications interface further being configured to intercept traffic from at least one of the USB media device and the end-user system from a USB bus;

logic, the logic being operable to determine whether the traffic includes unsafe content, wherein the logic is operable to provide the traffic to a destination on the USB bus when it is determined that the traffic does not include the unsafe content, and wherein the logic is further operable to block the traffic from being provided to the destination when it is determined that the traffic includes the unsafe content, wherein the logic operable to determine whether the traffic includes the unsafe content is further operable to identify a first signature associated with the traffic and to compare the first signature to at least one signature associated with known unsafe content, wherein the logic operable to block the traffic from being provided to the destination when it is determined that the traffic includes the unsafe content is operable to block the traffic from being provided to the destination when the first signature matches the at least one signature; and a data store, the data store being configured to store the at least one signature associated with the known unsafe content, wherein the logic operable to compare the first signature to the at least one signature associated with the known unsafe content is further operable to obtain the at least one signature associated with the known unsafe content from the data store.

16. The apparatus of claim 15 wherein the destination is the end-user system.

* * * * *